(12) United States Patent
Kitou

(10) Patent No.: US 9,694,730 B2
(45) Date of Patent: Jul. 4, 2017

(54) VEHICLE SEAT

(71) Applicants: TOYOTA BOSHOKU KABUSHIKI KAISHA, Aichi-ken (JP); TOYOTA JIDOSHA KABUSHIKI KAISHA, Aichi-ken (JP)

(72) Inventor: Hidekazu Kitou, Aichi-ken (JP)

(73) Assignees: TOYOTA BOSHOKU KABUSHIKI KAISHA, Aichi-Ken (JP); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 278 days.

(21) Appl. No.: 14/306,549

(22) Filed: Jun. 17, 2014

(65) Prior Publication Data

US 2014/0375098 A1  Dec. 25, 2014

(30) Foreign Application Priority Data

Jun. 20, 2013  (JP) .................................. 2013-129176

(51) Int. Cl.
*B60N 2/48* (2006.01)
*B60N 2/68* (2006.01)

(52) U.S. Cl.
CPC ........... *B60N 2/682* (2013.01); *B60N 2/4808* (2013.01); *B60N 2/68* (2013.01)

(58) Field of Classification Search
CPC .................................................. B60N 2/4808
See application file for complete search history.

(56) References Cited

U.S. PATENT DOCUMENTS

| | | | | |
|---|---|---|---|---|
| 4,854,642 A | * | 8/1989 | Vidwans | B60N 2/4817 297/391 |
| 5,397,170 A | * | 3/1995 | Shrock | B60N 2/4808 297/391 |
| 5,626,396 A | * | 5/1997 | Kuragano | B60N 2/68 297/391 |
| 5,816,658 A | * | 10/1998 | Wallis | B60N 2/4814 297/391 |

(Continued)

FOREIGN PATENT DOCUMENTS

| CN | 2012/40297 | 5/2009 |
|---|---|---|
| CN | 101468619 | 7/2009 |

(Continued)

OTHER PUBLICATIONS

Partial English language translation of Office Action issued in China Counterpart Patent Appl. No. 201410276256.5, dated Jan. 19, 2016.

(Continued)

*Primary Examiner* — Timothy J Brindley
(74) *Attorney, Agent, or Firm* — Greenblum & Bernstein, P.L.C.

(57) ABSTRACT

Paired mounting portions to which holders are attached are each formed as a notch or a through hole extending in an up-down direction of an upper frame, so that the paired mounting portions are disposed across a central position of the upper frame in a seat-width direction, and the holders are attached to the paired mounting portions, respectively, and then fixed to an upper face portion and a lower face portion of the upper frame at a seat rearward position relative to a seating face portion of the upper frame.

2 Claims, 8 Drawing Sheets

(56) References Cited

U.S. PATENT DOCUMENTS

| | | | | |
|---|---|---|---|---|
| 6,062,645 | A * | 5/2000 | Russell | B60N 2/4814 297/410 |
| 6,948,773 | B2 * | 9/2005 | Yetukuri | B60N 2/48 297/391 |
| 7,661,758 | B1 * | 2/2010 | Veine | B60N 2/4808 297/216.12 |
| 9,403,456 | B2 * | 8/2016 | Ozaki | B60N 2/4802 |
| 2002/0050729 | A1 * | 5/2002 | Nakano | B60N 2/4808 297/216.12 |
| 2006/0261661 | A1 * | 11/2006 | Kraft | B60N 2/4808 297/463.1 |
| 2009/0152929 | A1 | 6/2009 | Sung et al. | |
| 2012/0025583 | A1 * | 2/2012 | Yamada | B60N 2/4808 297/391 |
| 2012/0280552 | A1 * | 11/2012 | Line | B60N 2/4808 297/440.1 |
| 2013/0038112 | A1 * | 2/2013 | Gaines | B60N 2/4808 297/452.41 |

FOREIGN PATENT DOCUMENTS

| | | |
|---|---|---|
| CN | 102205809 | 10/2011 |
| CN | 102381219 | 3/2012 |
| CN | 102910098 | 2/2013 |
| DE | 4423912 | 1/1996 |
| DE | 60111474 | 6/2006 |
| DE | 102007022623 | 11/2008 |
| JP | 58-135326 | 9/1983 |
| JP | 08-182573 | 7/1996 |

OTHER PUBLICATIONS

Office Action issued in Germany Counterpart Patent Appl. No. 102014211527.2, dated Jul. 26, 2016, along with a partial English translation thereof.

Office Action issued in Japan Counterpart Patent Appl. No. 2013-129176, dated Mar. 7, 2017, along with a partial English translation thereof.

* cited by examiner

VEHICLE SEAT

INCORPORATION BY REFERENCE

The disclosure of Japanese Patent Application No. 2013-129176 filed on Jun. 20, 2013 including the specification, drawings and abstract is incorporated herein by reference in its entirety.

BACKGROUND OF THE INVENTION

1. Field of the Invention

The present invention relates to a vehicle seat including a box-shaped upper frame (an upper framework of a seatback) having a hat-shaped section, and a holder (a member into which a headrest stay is inserted).

2. Description of Related Art

As this type of vehicle seat, there has been known a vehicle seat described in Chinese Utility Model Publication No. 2012-40297. In the vehicle seat, a seatback rises from a seat cushion, and a headrest is attached to an upper part of a seatback. On a bottom part of the headrest, a pair of headrest stays (in a bar shape) are provided at a given interval in a projecting manner. A back frame (a metal frame body) serving as a seatback framework includes an upper frame serving as an upper framework, and an active headrest device. The upper frame is a box-shaped member having a hat-shaped section (a rear side is opened), and is provided with paired elongated holes into which the headrest stays are insertable. Each of the elongated holes is a hole portion penetrating through the upper frame in an up-down direction, and is elongated in a seat front-rear direction (sliding of the headrest stays in the seat front-rear direction is allowed). Further, the active headrest device is a device configured to tilt the headrest stays in the seat front-rear direction, and is disposed in a back frame (below the upper frame). In the publicly known technique, the headrest is placed on an upper part of the back frame (in an upright state), and then, each of the headrest stays is inserted into each of the elongated holes so as to be connected to the active headrest device. At the time of a rear collision of a vehicle, the active headrest device is driven to tilt the headrest stays forward (to slide the headrest stays in the elongated holes), thereby making it possible to move the headrest to an occupant-head side.

SUMMARY OF THE INVENTION

In the meantime, the abovementioned seat configuration has such a concern that, at the time of a vehicle collision, an occupant head is pressed against the headrest (by a force in a direction where the headrest stays are tilted backward), and the upper frame is broken. In the configuration of the publicly known technique, for example, due to the backward tilting of the headrest stays, an excessive force (a force to cause bending deformation or torsional deformation) is added to the upper frame. Due to the excessive force, the upper frame may be deformed (e.g., the upper frame is deformed in an expanding manner in a direction where its top face is separated from its bottom face). An entire surface of a rear part of the upper frame may be covered with a metal cover material so as to form a closed-section structure (a structure that is hard to be deformed), but a configuration tends to be complicated due to an increase in the number of seat components, or the like reason. The present invention provides a vehicle seat that is able to prevent a deformation of an upper frame as much as possible with a relatively simple configuration.

A vehicle seat according to an aspect of the present invention includes: a seat cushion; a seatback connected to the seat cushion so that the seatback is able to rise therefrom; and a headrest attached to the seatback via paired bar-shaped headrest stays. The seatback includes a back frame serving as a framework of the seatback. The back frame includes an upper frame serving as an upper framework with respect to an upright state of the seatback, and holders into which the headrest stays are inserted in a seat up-down direction. The upper frame has a hat-shaped section in which a seat rear side thereof is opened, and includes a seating face portion, an upper face portion, and a lower face portion. In such a configuration, it is preferable that deformation of the upper frame be prevented as much as possible with a relatively simple configuration.

In view of this, in the present aspect, paired mounting portions to which the holders are attached are each formed as a notch or a through hole extending in an up-down direction of the upper frame, so that the paired mounting portions are disposed across a central position of the upper frame in a seat-width direction; and the holders are attached to the paired mounting portions, respectively, and then fixed to the upper face portion and the lower face portion at a seat rearward position relative to the seating face portion. In the present aspect, each of the holders is fixed to the upper face portion and the lower face portion (with a relatively simple configuration), so that the upper frame has a partially closed section (that is, a configuration that is hard to be deformed is attained). Further, the paired holders are placed across the central position (a relatively easily deformable portion) of the upper frame, thereby making it possible to prevent deformation of the upper frame as much as possible.

In the above aspect, with respect to the upright state of the seatback, each of the mounting portions may be a hole portion penetrating through the upper face portion and the lower face portion in an up-down direction, and each of the holders may be disposed so as to contact with at least one of a rear edge portion of the each of the mounting portions in the upper face portion and a front edge portion of the each of the mounting portions in the lower face portion. In this configuration, each of the holders contacts with the upper face portion or the lower face portion at an appropriate position, thereby making it possible to regulate a backward tilting operation of each of the headrest stays itself.

According to the above aspect, it is possible to prevent deformation of an upper frame as much as possible with a relatively simple configuration. Further, according to the above aspect, it is possible to more surely regulate the deformation of the upper frame with a relatively simple configuration.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
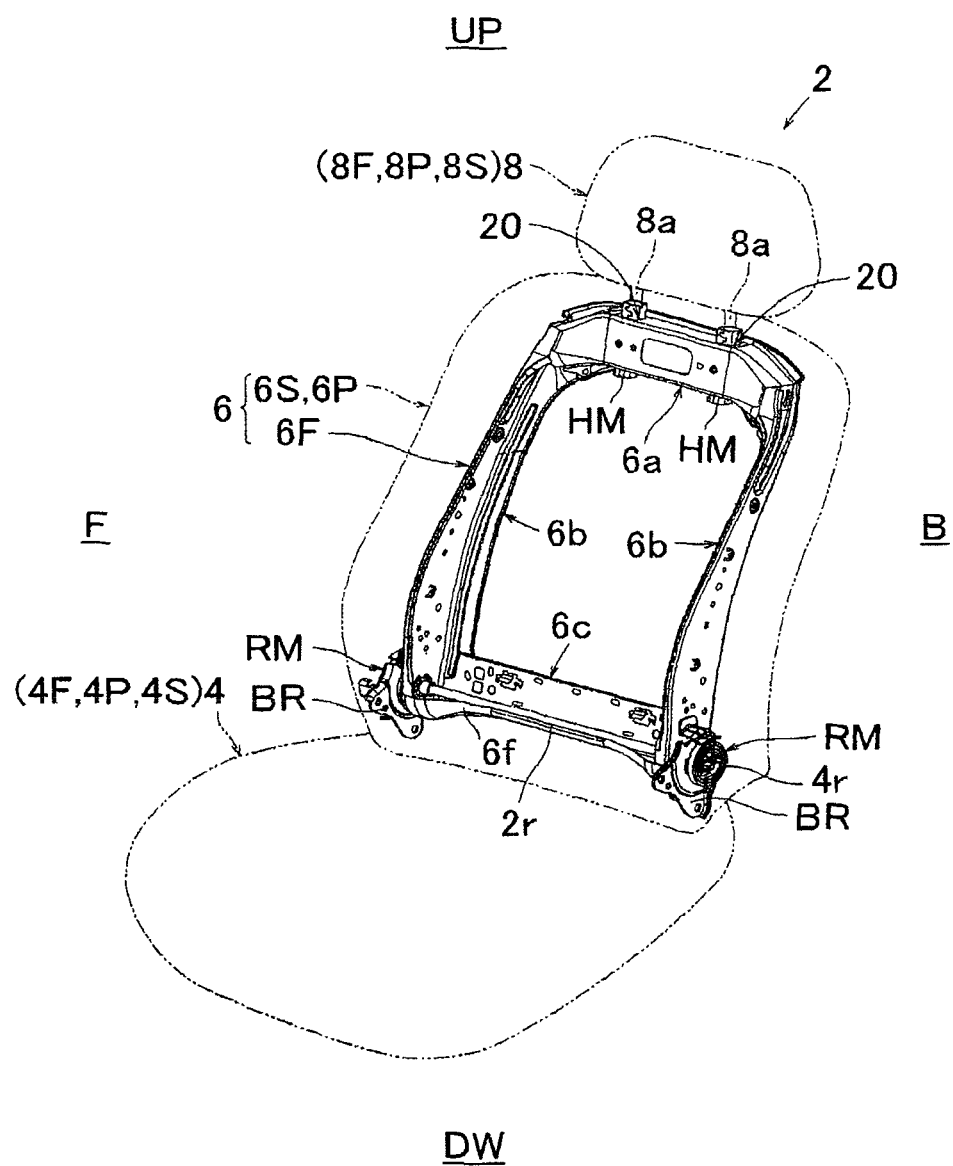
FIG. 1 is a partial perspective view of a vehicle seat.

The following describes an embodiment for carrying out the present invention with reference to FIGS. 1 to 8. In each figure, a reference sign F is assigned to a vehicle-seat front side, a reference sign B is assigned to a vehicle-seat rear side, a reference sign UP is assigned to a vehicle-seat upper side, and a reference sign DW is assigned to a vehicle-seat lower side. A vehicle seat 2 in FIG. 1 includes a seat cushion 4, a seatback 6, and a headrest 8. These seat components each includes: a seat frame (4F, 6F, 8F) serving as a seat framework; a seat pad (4P, 6P, 8P) serving as a seat outer shape and supporting an occupant elastically; and a seat cover (4S, 6S, 8S) covering the seat pad. Here, the seatback 6 is connected to the seat cushion 4 so that the seatback 6 is able to rise and tilt with respect to the seat cushion 4. Further, the headrest 8 is attached to an upper part of the seatback 6 via paired headrest stays 8a (bar-shaped members).

In the present embodiment, the back frame 6F (metal) of the seatback 6 includes an upper frame 6a, paired side frames 6b, a lower frame 6c, and related constituents (paired holders HM, recliners RM) (see FIGS. 1 to 4). The paired side frames 6b are plate-shaped members serving as respective side frameworks. Each of the side frames 6b of the present embodiment has a generally lateral U shape (in a sectional view), and a front end part and a rear end part thereof are bent toward a seat inward side with respect to an upright state. Note that, referring to FIG. 7, each of the side frames 6b of the present embodiment is configured such that its dimension in the seat front-rear direction is set slightly shorter than that part of the after-mentioned upper frame 6a which is placed at a central position (this contributes to realizing of a thin configuration of the seat). Further, the lower frame 6c is a plate-shaped member serving as a lower framework (having a generally rectangular shape in a front view), and is placeable in a bridging manner between the paired side frames 6b. The lower frame 6c of the present embodiment has a generally lateral L shape (in a sectional view). A lower part (a projection portion 6f) of the lower frame 6c projects toward a seat front side, and is disposed around the after-mentioned operating rod 2r (see FIG. 1).

The upper frame 6a is a box-shaped member serving as an upper framework (having a generally rectangular shape in a front view), and is placeable in a bridging manner between the paired side frames 6b (see FIGS. 1 to 5). The upper frame 6a of the present embodiment has a hat-shaped section in which a seat rear side is opened, and includes a seating face portion 10, an upper face portion 12, a lower face portion 14, and paired mounting portions 20 (described later) (see FIG. 5). Note that, referring to FIG. 7, end sides of the upper frame 6a in a seat width direction (end parts outside the after-mentioned mounting portion 20) is configured such that its width dimension in a front-rear direction is set slightly shorter than that part of the upper frame 6a which is at the central position (that is, the width dimension is set to be insertable into the side frame). The seating face portion 10 is a generally flat part serving as a seating side of the upper frame 6a, with respect to a state where the seatback rises. Further, the upper face portion 12 is a part serving as an upper side of the upper frame 6a, and the lower face portion 14 is a part serving as a lower side of the upper frame 6a. In the present embodiment, the upper face portion 12 and the lower face portion 14 are placed so as to face each other and to be separated from each other at a given interval in a seat up-down direction. In the present embodiment, a seat rear side of the upper face portion 12 is folded upward in a generally semicircular shape, and a seat rear side of the lower face portion 14 is folded downward in a generally semicircular shape (each of the face portions 12, 14 are formed in a curled flange shape excellent in rigidity).

Figure 2:
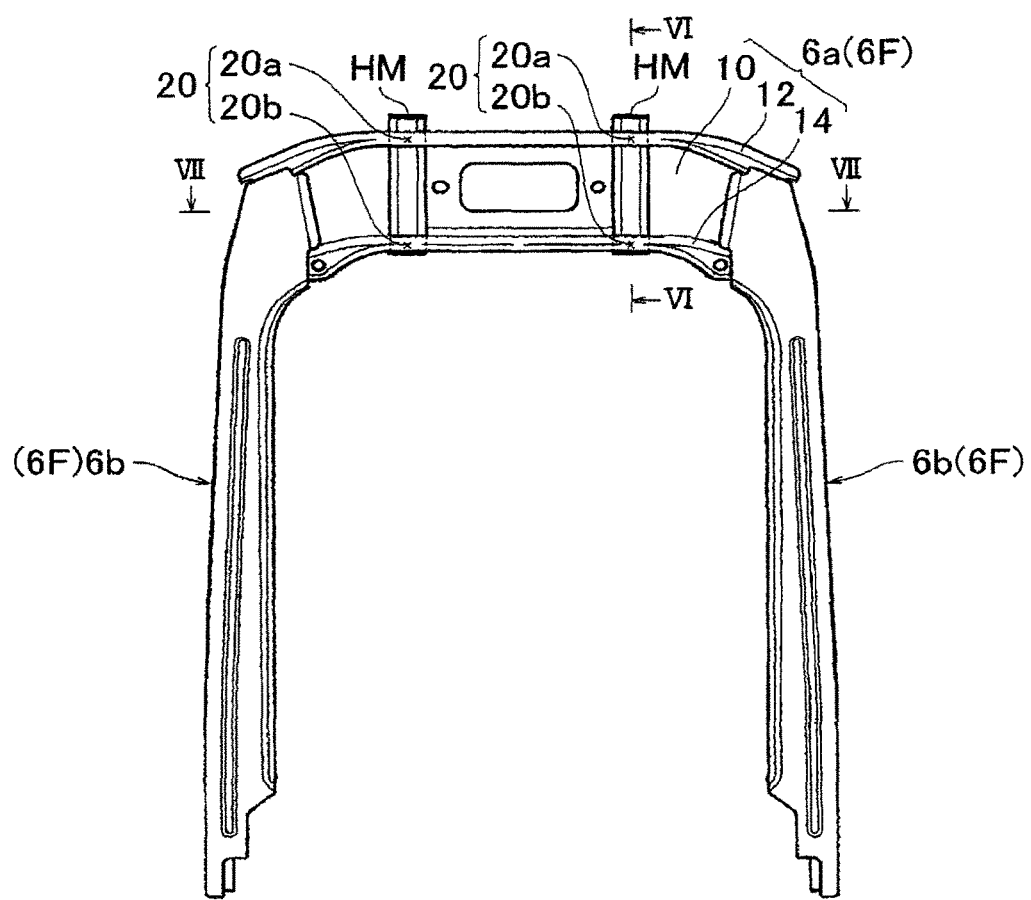
FIG. 2 is a front view of part of a back frame.
Figure 3:
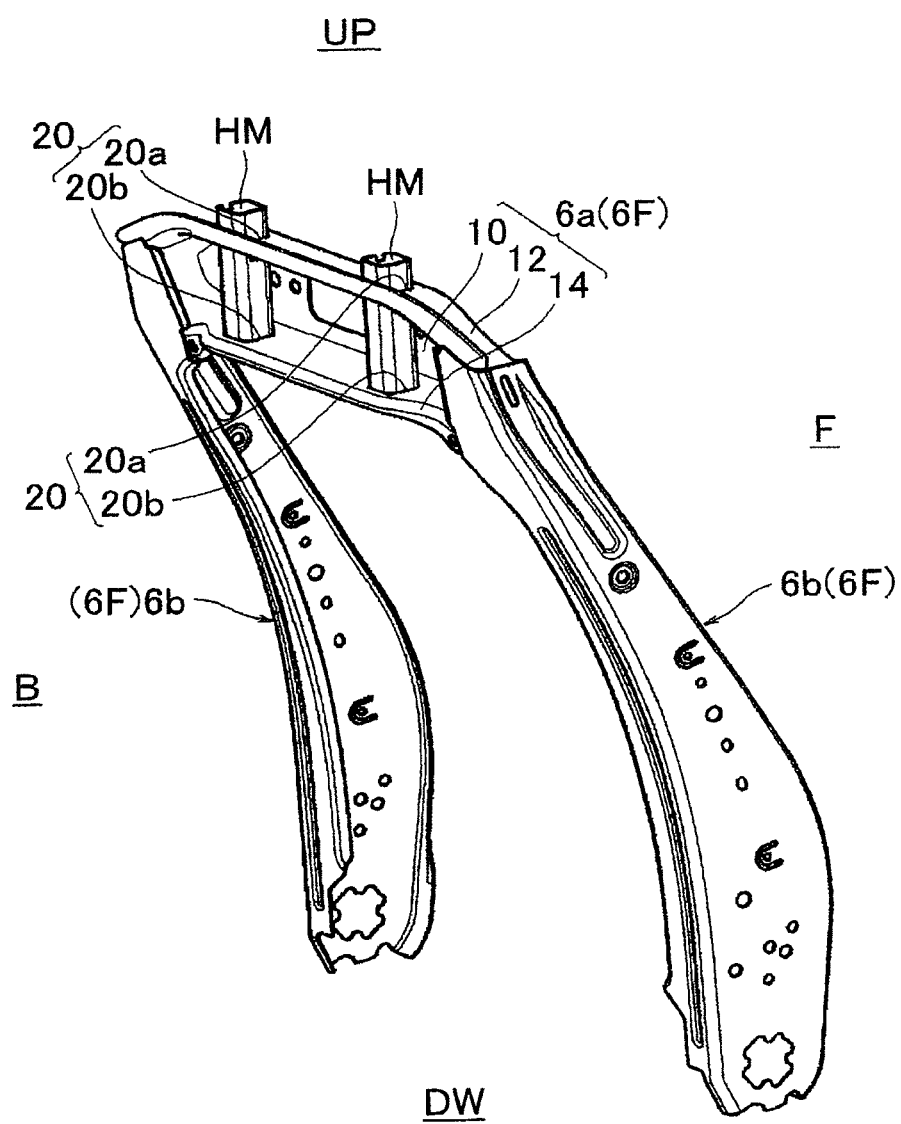
FIG. 3 is a perspective view of the part of the back frame viewed from a rear side.
Figure 4:
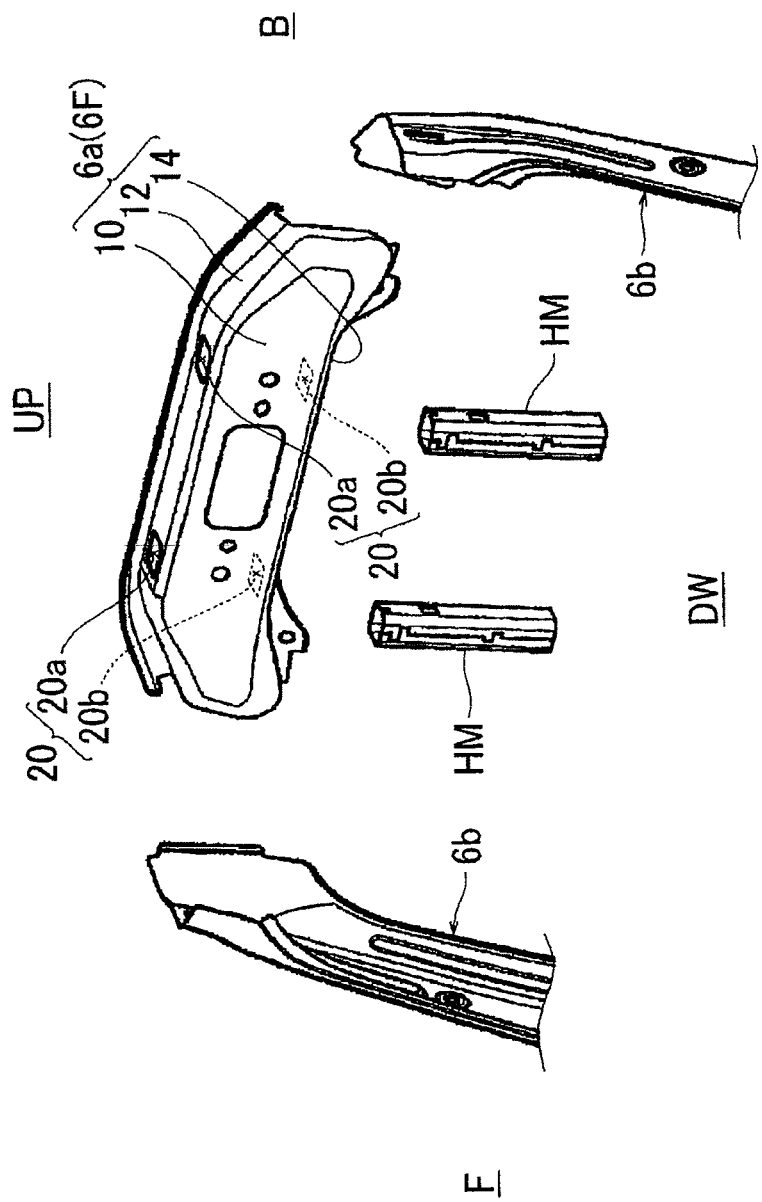
FIG. 4 is a perspective view illustrating the part of the back frame in an exploded manner.
Figure 5:
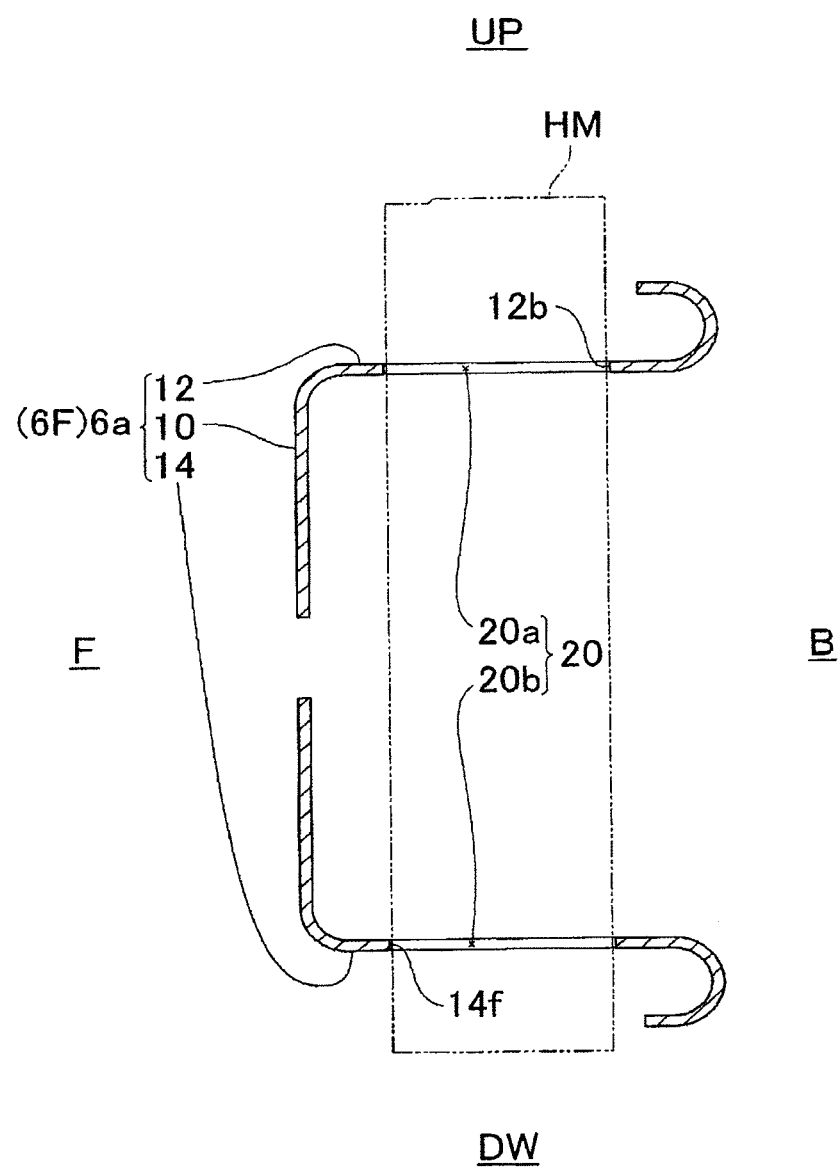
FIG. 5 is a sectional view of part of an upper frame.
Figure 6:
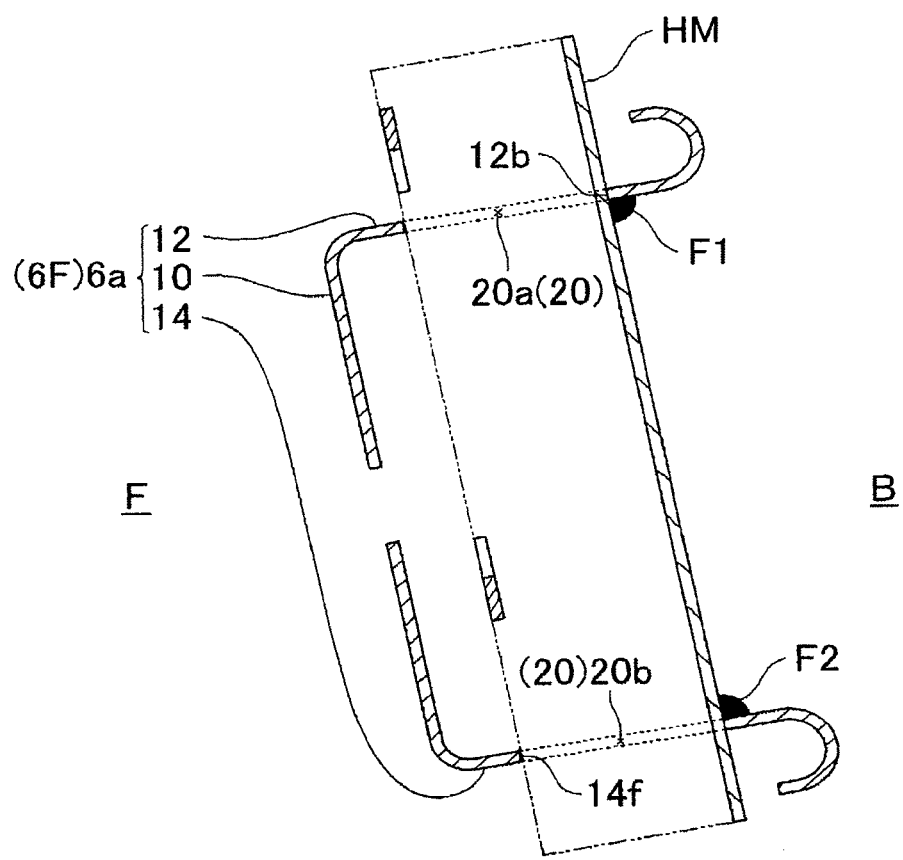
FIG. 6 is a sectional view taken along a line VI-VI of FIG. 2.
Figure 7:
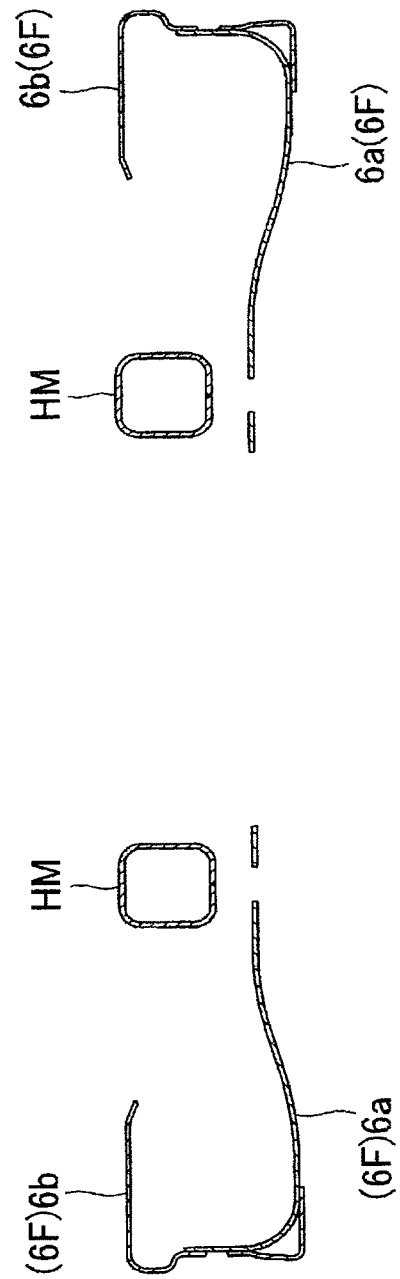
FIG. 7 is a sectional view taken along a line VII-VII of FIG. 2.
Figure 8:
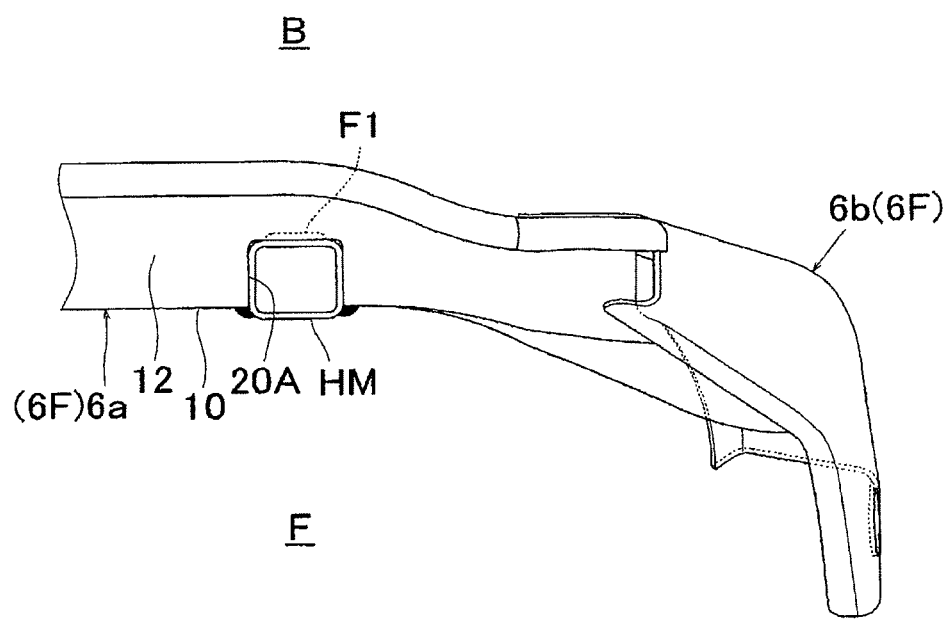
FIG. 8 is a perspective view of part of a back frame according to a modified embodiment, viewed from an upper side.

Here, the paired holders HM (having generally the same configuration) are tubular members (in a square column shape) in which both ends are opened, and are into which the headrest stays 8a are inserted via headrest supports (tubular materials), which are not illustrated herein (see FIGS. 2 to 4). Each of the holders HM of the present embodiment has a linear dimension that allows the each of the holders HM to penetrate through the upper frame 6a in the seat up-down direction (a linear dimension that allows the each of the holders HM to bridge the upper face portion 12 and the lower face portion 14) (see FIG. 5). Note that each of the holders HM is formed by bending a flat plate so as to be deformed in a tubular shape, and a partial gap is provided in its connection end side (an end part on a seating side) (see FIG. 6).

Each of the paired mounting portions 20 is a part in which the holder HM is provided in an inserted manner, and can be provided on a seat rear side relative to the seating face portion 10 (see FIGS. 2 to 5). In the present embodiment, the paired mounting portions 20 are placed across the central position of the upper frame 6a in the seat-width direction (at a position where the paired mounting portions 20 are placed generally symmetrically). Note that, in the present embodiment, a generally rectangular hole portion (without any reference sign) is formed at the central position of the upper frame 6a (the seating face portion 10) from a viewpoint of lightweighting and the like. Each of the mounting portions 20 is constituted by a first hole portion 20a in the upper face portion 12 and a second hole portion 20b in the lower face portion 14 (see FIG. 5). The first hole portion 20a is a hole portion penetrating through the upper face portion 12 in the up-down direction, and configured such that the holder HM is insertable therein. Further, the second hole portion 20b is a hole portion (having the same opening dimension as the first hole portion 20a) penetrating through the lower face portion 14 in the up-down direction, and is disposed so as to face the first hole portion 20a. At this time, an opening shape of each of the mounting portions 20 is adjusted appropriately, so as to allow a rear edge portion 12b of the first hole portion 20a to contact with the insertion holder HM in an inserted state (see FIG. 6). Further, a front edge portion 14f of the second hole portion 20b is able to contact with the insertion holder HM in an inserted state.

The recliner RM (a generally cylindrical member) is a member configured to regulate a rising and tilting operation of the seatback 6 with respect to the seat cushion 4, and includes internal constituents (not shown), an operating rod 2r, and a biasing member 4r (see FIG. 1). The operating rod 2r is a pipe material elongated in the seat-width direction, and the biasing member 4r is a spiral spring-shaped member. In the present embodiment, the recliners RM are respectively fixed to the side frames 6b (to their lower parts), and are rotatably attached to respective bracket portions BR of the seat cushion 4 (the seat frame 4F). Further, the operating rod 2r is placed between the lower parts of the paired side frames 6b in a bridging manner. In this state, both ends of the operating rod 2r are provided in an inserted manner into the respective recliners RM so as to be rotatable around its axis. Subsequently, the biasing members 4r are attached to end parts of the operating rod 2r, so as to bias the operating rod 2r in a direction where the operating rod 2r rotates in one direction. Then, the operating rod 2r rotates in the other direction against a biasing force of the biasing members 4r, so that the recliners RM (the internal constituents) are unlocked. Hereby, the seatback 6 is able to rise and tilt (rotate) relative to the seat cushion 4 with the recliners RM as a rotation center (e.g., the seatback 6 is able to tilt forward or rearward from an upright state in FIG. 1). Further, when the operating rod 2r rotates in the one direction due to the biasing force of the biasing members 4r, the recliners RM (the internal constituents) are locked, so that the rising and tilting operation of the seatback 6 relative to the seat cushion 4 is regulated.

Referring now to FIGS. 1 and 4, a plurality of frames 6a, 6b, 6c is welded to be integrated with each other, and related constituents (the holders HM and the like) are attached thereto. In the present embodiment, the lower frame 6c is placed between the paired side frames 6b (the lower parts) in a bridging manner, and then the frames are welded to be integrated with each other. Further, the upper frame 6a is placed between the paired side frames 6b (the upper parts) in a bridging manner, and then the frames are welded to be integrated with each other. At this time, end parts of the upper frame 6a (end parts in the seat-width direction) are placed in respective upper parts of the side frames 6b (between a front end part and a rear end part thereof), and both frames are integrated with each other by laser beam welding or the like. About the time of the above operation, the paired holders HM are inserted into the upper frames 6a (the mounting portions 20) so as to be placed on right and left sides across the central position of the upper frame 6a (see FIGS. 4, 6, and 7). At this time, in the present embodiment, each of the holders HM contacts with the rear edge portion 12b of the first hole portion 20a (the mounting portion in the upper face portion). Similarly, each of the holders HM contacts with the front edge portion 14f of the second hole portion 20b (the mounting portion in the lower face portion). In this state, a rear part of each of the holders HM (a seat rearward position relative to the seating face portion 10) is fixed to the upper face portion 12 by welding (to form a fixed point F1). Similarly, a rear part of each of the holders HM is fixed to the lower face portion 14 by welding (to form a fixed point F2).

In the abovementioned seat configuration, at the time of a vehicle collision or the like, an occupant head is pressed against the headrest 8 (due to backward tilting of the headrest stays 8a), an excessive force is added to the upper frame 6a (see FIG. 1). Due to the excessive force, the upper frame 6a may be deformed (deformed in an expanding manner in a direction where the upper face portion 12 is separated from the lower face portion 14, for example) (see FIGS. 5 and 6). In view of this, in the present embodiment, each of the holders HM is fixed to the upper face portion 12 and the lower face portion 14, so that the upper frame 6a has a partially closed section. As such, a relative movement between the upper face portion 12 and the lower face portion 14 is regulated by the holders HM, thereby making it possible to maintain a shape of the upper frame 6a against the backward tilting of the headrest stays 8a (that is, a configuration that is hard to be deformed is attained). Further, the paired holders HM are disposed across the central position of the upper frame 6a (a part that is relatively easily deformed) (see FIGS. 2 and 7). As such, the central position (a vulnerable portion) of the upper frame 6a is supported by the closing-section structure from right and left sides of the seat, thereby making it possible to prevent deformation of the upper frame 6a appropriately. Further, in the present embodiment, backward tilting of the holder HM is regulated due to the contact with the rear edge portion 12b of the first hole portion 20a (the mounting portion in the upper face portion) (see FIG. 6). Further, similarly, the backward tilting of the holder HM is regulated due to the contact with the front edge portion 14f of the second hole portion 20b (the mounting portion of the lower face portion). Thus, with the use of the mounting portion 20 (the edge portions), a backward tilting operation of the holder HM itself is regulated, thereby making it possible to more surely prevent deformation of the upper frame 6a.

As described above, in the present embodiment, each of the holders HM is fixed to the upper face portion 12 and the lower face portion 14 (with a relatively simple configuration), so that the upper frame 6a has a partially closed section. Further, the paired holders HM are placed across the central position of the upper frame 6a, thereby making it possible to prevent deformation of the upper frame 6a as much as possible. Further, in the present embodiment, each of the holders HM contacts with the upper face portion 12 and the lower face portion 14 at appropriate positions, thereby making it possible to regulate a backward tilting operation of each of the headrest stays 8a itself. With such a configuration, it is also possible to reduce occurrence of hyperextension damage (so-called whiplash injury) to a neck of an occupant due to the backward tilting of each of the headrest stays 8a (a backward movement of the headrest 8). Hereby, according to the present embodiment, it is possible to prevent deformation of the upper frame 6a as much as possible with a relatively simple configuration.

Here, the mounting portion can be provided in a notch shape, except for the abovementioned configuration (the hole portion). For example, each mounting portion 20A of a modified embodiment is formed by cutting out a seating side of an upper frame 6a in a seat up-down direction, and has a shape to which each holder HM (a rear part) is fittable (in FIG. 8, only one mounting portion is illustrated for convenience). In each mounting portion 20A, a seating face portion 10 is cut out in the seat up-down direction, and an upper face portion 12 and a lower face portion (not shown) is cut out in a generally rectangular shape. Then, the holders HM are fitted to the mounting portions 20A so as to be placed on right and left sides across a central position of the upper frame 6a in a seat width direction. A side surface of each holder HM is fixed to the seating face portion 10 by welding or the like, and the rear part of the each holder HM is fixed to the upper face portion 12 by welding or the like from an inner surface side or an outer surface side (a first fixed point F1). Similarly, the rear part of the each holder HM is fixed to a lower face portion (not shown) by welding or the like. Thus, even in the modified embodiment, each holder HM is fixed to the upper face portion 12 and the lower face portion at a seat rearward position relative to the seating face portion 10, so that the upper frame 6a has a partially closed section. Even according to the modified embodiment, it is possible to prevent deformation of the upper frame 6a as much as possible with a relatively simple configuration.

The vehicle seat of the present embodiment is not limited to the above embodiment, and other various embodiments can be taken. The present embodiment deals with an example of the upper frame 6a having a hat-shaped section, but is not intended to limit the configuration of the frame. Other than a case where the upper face portion and the lower face portion are placed generally in parallel to each other, the upper face portion and the lower face portion can be placed so as to be gradually separated from or close to each other as they go toward the seat rear side, for example. Further, the upper frame may be configured such that only that part of the upper frame which can face the headrest has a hat-shaped section, and the other part has a closed-shaped section or the like different from the hat-shaped section. Further, the present embodiment deals with an example in which the first hole portion 20a (the rear edge portion) and the second hole portion 20b (the front edge portion) contact with the holder HM in an inserted state. Differently from this, either one of the first hole portion (the rear edge portion) and the second hole portion (the front edge portion) can be configured to contact with the holder in an inserted state. Further, depending on a seat configuration, an entire circumference of at least one of the first hole portion and the second hole portion can be configured to contact with the holder HM in an inserted state.

Further, the present embodiment exemplifies the configuration of each mounting portion 20 (an opening shape thereof, the number thereof to be formed, a position thereof, and the like), but is not intended to limit the configuration of the mounting portion 20. For example, the paired mounting portions can be provided at left and right positions in an asymmetrical manner. At this time, a dimension (spacing dimension) between the mounting portions can be set according to a seat configuration, appropriately (the mounting portions may overlap with the hole portion of the seating face portion). Further, in a case where three or more headrest stays are provided, three or more mounting portions can be provided accordingly. Further, the present embodiment deals with an example in which the upper face portion 12 and the lower face portion 14 are fixed to the holder HM by welding, but is not intended to limit a fixing method. For example, the fixing method of the holder HM can be a physical fixing method by use of adhesion, caulking, bolt members, or the like, provided that the fixing method is able to regulate the relative movement between the upper face portion and the lower face portion. Further, a fixed position of the holder to each face portion may be a seat rear side relative to a seating side, and a side surface (a plane in the seat-width direction) of the holder can be fixed to the upper face portion and the lower face portion, for example. Further, the present embodiment deals with an example of the back frame 6F and the related constituents, but the configurations of these members are modifiable appropriately. For example, the lower frame may not be provided in the back frame (the back frame may be formed in an arch shape). The configuration of the present embodiment is applicable to various vehicle seats of a vehicle, an aircraft, an electric railcar, and the like.

What is claimed is:

1. A vehicle seat comprising:
a seat cushion;
a seatback connected to the seat cushion so that the seatback is able to rise therefrom; and
a headrest attached to the seatback via paired bar-shaped headrest stays, wherein:
the seatback includes a back frame serving as a framework of the seatback;
the back frame includes an upper frame serving as an upper framework with respect to an upright state of the seatback, and holders into which the headrest stays are inserted in a seat up-down direction;
the upper frame has a u-shaped section in a direction of a rear side to a front side of the vehicle seat, and the upper frame including a seating face portion, an upper face portion, and a lower face portion;
paired mounting portions to which the holders are attached are each formed as a notch or a through hole extending in an up-down direction of the upper frame, so that the paired mounting portions are disposed across a central position of the upper frame in a seat-width direction; and
the holders are attached to the paired mounting portions, respectively, and then fixed to the upper face portion and the lower face portion at a seat rearward position relative to the seating face portion, wherein
a first weld is formed on a rear surface of each of the holders and an inner surface of the upper face portion and a second weld is formed on the rear surface of each of the holders and an inner surface of the lower face portion such that the upper frame is permanently fixed to the holders.

2. The vehicle seat according to claim 1, wherein:
with respect to the upright state of the seatback, each of the mounting portions is a hole portion penetrating through the upper face portion and the lower face portion in an up-down direction, and each of the holders is disposed so as to contact with at least one of a rear edge portion of the each of the mounting portions in the upper face portion and a front edge portion of the each of the mounting portions in the lower face portion.

* * * * *